(12) United States Patent
Aust et al.

(10) Patent No.: US 6,467,089 B1
(45) Date of Patent: Oct. 15, 2002

(54) AUDIENCE MEASUREMENT SYSTEM INCORPORATING A MOBILE HANDSET

(75) Inventors: Edgar W. Aust, Palm Harbor; Daozheng Lu, Dunedin, both of FL (US)

(73) Assignee: Nielsen Media Research, Inc., New York, NY (US)

( * ) Notice: Subject to any disclaimer, the term of this patent is extended or adjusted under 35 U.S.C. 154(b) by 0 days.

(21) Appl. No.: 08/997,316

(22) Filed: Dec. 23, 1997

(51) Int. Cl.$^7$ .............................. H04N 9/00; H04N 7/16
(52) U.S. Cl. ............... 725/13; 725/9; 725/11; 455/2.01
(58) Field of Search .............. 348/1, 2, 6, 10, 348/11, 12, 13, 14; 455/2, 2.01; 725/9–21, 23, 44–47; H04N 9/00, 7/16

(56) References Cited

U.S. PATENT DOCUMENTS

| | | | | |
|---|---|---|---|---|
| 4,858,000 A | | 8/1989 | Lu ............................ 358/84 |
| 4,930,011 A | * | 5/1990 | Kiewit ........................ 348/2 |
| 5,373,315 A | * | 12/1994 | Dufresne et al. ........... 725/11 |
| 5,382,983 A | * | 1/1995 | Kwoh et al. ............... 348/716 |
| 5,444,769 A | * | 8/1995 | Koen et al. ............. 379/92.01 |
| 5,481,294 A | | 1/1996 | Thomas et al. ............... 348/1 |
| 5,483,276 A | | 1/1996 | Brooks et al. ................ 348/2 |
| 5,629,739 A | | 5/1997 | Dougherty ................. 348/486 |
| 6,005,490 A | * | 12/1999 | Higashihara .......... 340/825.72 |
| 6,157,413 A | * | 12/2000 | Hanafee et al. ............ 348/563 |

FOREIGN PATENT DOCUMENTS

| | | | | |
|---|---|---|---|---|
| EP | 0 275 328 | 7/1988 | | |
| EP | 0 425 347 | 5/1991 | | |
| EP | 0 697 773 | 2/1996 | | |
| EP | 0 697 773 A2 | * 2/1996 | ............ H04N/9/00 |
| EP | 0 713 335 | 5/1996 | | |
| EP | 0 713 335 A2 | * 5/1996 | ............ H04N/7/08 |

OTHER PUBLICATIONS

International Search Report, dated Aug. 14, 1998, Application No. PCT/US98/11810.

* cited by examiner

*Primary Examiner*—Andrew Faile
*Assistant Examiner*—Vivek Srivastava
(74) *Attorney, Agent, or Firm*—Katten Muchin Zavis

(57) ABSTRACT

An audience measurement system for a receiver comprises monitoring equipment, such as a decoder, ON/OFF detector and transmitter, coupled to the receiver. The decoder reads program codes embedded in a program received by the receiver. The system also comprises a base unit and a mobile unit, such as a telephone handset. The handset receives the program codes transmitted from the decoder and prompts (via a visual display or audio tone) an audience member to enter personal data (i.e. who the audience member is) via a keypad or voice input. The program data (from the decoder) and personal data (input by the audience member) is provided to the base unit, where it is time stamped and stored. The base unit includes telephone circuitry to transmit the stored data to a data collection central facility via a public switched telephone network. If no program codes are found or if the monitoring equipment is eliminated, the mobile unit prompts the audience member to enter program data that may be selected from a previously downloaded program schedule.

67 Claims, 4 Drawing Sheets

AUDIENCE MEASUREMENT SYSTEM INCORPORATING A MOBILE HANDSET

FIELD OF THE INVENTION

The present invention relates to the measurement of broadcast audiences, and more particularly to arrangements for periodic collection of audience data via a modified telephone handset.

DESCRIPTION OF PRIOR ART

Many approaches have been proposed and used to serve the long recognized need for determining the size of the audience to a radio or television broadcast. This overall measurement is conventionally divided into two segments: 1) determining the programs to which receivers in statistically selected households are tuned (i.e., what program is being broadcast on a radio or television) and 2) determining the audience of the receiver in the statistically selected household (i.e., who is watching the television or listening to the radio). That is, there are inherently two components to the measurement—reporting the usage of electronic entertainment equipment (commonly called "tuning" data) and reporting the identity of audience members (commonly called "personal" or "viewing" data).

Of the many approaches to measuring the usage of electronic entertainment equipment, one of particular relevance has been that of adding a labeling code (sometimes referred to as an ancillary code or, more generally, ancillary data) to a radio or television program, distributing the code with the program throughout the relevant broadcasting system, and then detecting and interpreting the code when the broadcast signal is viewed or heard in a statistically selected dwelling unit. Teachings of the prior art in this area may be found in Thomas, et al., U.S. Pat. No. 5,481,294, Dougherty, U.S. Pat. No. 5,629,739, and Chan, co-pending application Ser. No. 08/654,309, all of which are assigned to the same assignee as the present invention and incorporated herein by reference.

Several approaches have been proposed or used for the complementary matter of identifying the users of the electronic medium being measured, i.e., collecting personal data. These approaches are referred to herein as audience member interrogation, audience member tagging, and passive audience member identification. As will be seen in the ensuing disclosure, there is some overlap among these approaches.

One approach to collecting personal data is that of audience member interrogation wherein the audience member is asked to identify himself or herself as a member of the audience. This may be done by means of a personal interview (commonly conducted by telephone), a paper viewing diary, or an electronic input device (commonly referred to as a "People Meter") associated with a receiver in a statistically sampled dwelling unit. In the latter case it is common to store both the personal data and the tuning data associated with each receiver in the sample dwelling unit in store-and-forward equipment and to subsequently forward these data to a central office computer via the public switched telephone network on a daily (or other periodic or non-periodic) basis.

In audience member tagging methods, each person in a sampled dwelling unit is asked to carry or wear a tag that is uniquely associated with that person. In some tagging schemes, apparatus associated with each broadcast receiver determines which tagged persons are close enough to the receiver to be counted as members of the audience, and stores those data with data on the stations tuned or programs viewed. One such tagging system is described in Kiewit, U.S. Pat. No. 4,930,011, assigned to the same assignee as the present invention, which uses electronically active tags which are worn or carried by members of an audience and which uniquely identify corresponding ones of these audience members.

Tagging systems commonly require the use of short range communication means (e.g. acoustic or infra-red) between the tag and the receiver to avoid confusion as to which set a person is viewing when two receivers in different rooms are turned on at the same time. Longer range communication means (e.g. radio transmissions) are not practical because radio frequency (RF) signals pass through interior walls of the dwelling unit so that the strength of a received signal cannot be relied on for localizing the signal source. The restriction to short range communication means has generally imposed at least one of two measurement difficulties on such systems. In some cases, the communication range is too long for the spacing between receivers in a sampled dwelling unit, thus leading to ambiguous data. In other cases, the range is too short and viewing from persons too far from the receiver to be detected is under-reported.

In passive audience member identification methods, audience members are not required to take an active role in their identifications, such as by wearing a tag or manually entering identification data. Thus, the audience member is not asked to do anything that departs from his or her normal routine of television viewing. Approaches of this sort (for example, Lu, U.S. Pat. No. 4,858,000, which is assigned to the same assignee as the present invention) are commonly predicated on the use of an imaging device (such as an infrared or television camera) providing digital images of the audience to a computer running an image recognition program. While these systems are generally effective, they are complex and often very expensive.

A recent development in telephony is a cordless "smart" telephone comprising a base unit having a keypad and a small alphanumeric liquid crystal display (LCD) (e.g., one on which sixteen lines of seventy five characters each can be displayed). The base unit is used with one or more associated battery powered handset(s), each of which also has a smaller LCD. In some simple models, a small display on either a telephone or a separate unit is useful for recently instituted telephone services, such as Caller ID, in which the number from which someone is calling is displayed on either or both displays before the user answers the call. Communication between the handset and base units is by means of radio frequency. Known communication channel management schemes, such as code-division multiple access (CDMA), are employed with smart phones so as to permit the use of more than one handset with a single base unit.

A recent enhancement in television broadcast services is a dial-up database service providing local current programming information that can be downloaded to a caller's computer. Also known in the broadcasting arts is the use of a dedicated viewer's guide channel on a cable system that simultaneously displays a plurality of video images, each of which corresponds to a tunable channel. An audience member may select this channel to see an overview of what is available on the cable system and select a desired program from the displayed lineup.

The present invention incorporates one or both of these recent innovations in order to provide a less complex and expensive component for audience measurement.

SUMMARY OF THE INVENTION

An audience measurement system, having several embodiments, is built around the features offered by a smart telephone having a base unit and at least one mobile handset that preferably comprises a keypad and an alphanumeric display. The handset is modified for use as a mobile unit in an audience measurement system of the invention.

In one embodiment, the audience measurement system of the invention comprises an ON/OFF detector and a decoder coupled to a monitored receiver, wherein the decoder decodes a program label associated with a program being viewed and transmits the program label to the mobile unit telephone handset. An audience member provides an input to the mobile unit identifying himself or herself as an audience member of the labeled program, and the mobile unit temporarily stores the current program label and personal data in a memory and periodically transmits those data to the telephone base unit. The telephone base unit stores the data in a store-and-forward memory with other tuning and personal data from television viewing activity in the dwelling unit and periodically forwards the aggregated data to a central facility for use in generating television audience estimates. The audience member's self-identifying input may be provided by means of the keypad on the mobile unit or by speaking into the mobile unit, which, as mentioned supra, may comprise a cordless telephone handset. The spoken identification message, or a compressed replica thereof, is forwarded to the base unit and is recognized, by means of known voice recognition methods, either at the base unit, or at the data collection central facility.

Alternatively, the decoder may be included in the handset, rather than being coupled to the monitored receiver. If the decoder is incorporated into the handset, the handset also includes an optical or audio sensor to detect the program code from the receiver.

In a preferred embodiment, radio frequency (RF) signaling is used to transfer data between the mobile and base units, between the monitoring equipment and the base unit and between the monitoring equipment and the mobile unit. When a receiver is in use, an ON/OFF detector can initiate a message to the mobile unit in order to prompt the audience member to confirm his or her identity. When more than one receiver and multiple mobile units in the sampled dwelling unit are in use simultaneously, CDMA or other RF modulation and tuning techniques avoid any ambiguities that may arise.

The invention can also be used even if no program-labeling code is found on a program being viewed. This may occur due to an equipment or broadcast system failure, or, the receiver may be selectively operated without the decoder. In such cases, the system of the invention provides means whereby a local program schedule is downloaded from a central facility to a memory associated with the base unit (e.g., during regularly scheduled data collection telephone communications between the base unit and the central facility). The schedule data may be communicated from the base unit to the mobile unit for display upon the screen thereof, whereupon the audience member can scroll through, or otherwise view, the list of available programs and can indicate to the measurement system which one of those is the one being currently viewed.

According to one aspect of the present invention, an audience measurement system for a receiver comprises monitoring equipment associated with the receiver and connected to a transmitter, a mobile unit having a transceiver which receives program data from the transmitter and an audience member interface which prompts an audience member to enter personal data and receives data from the audience member, and a base unit having a transceiver which receives the program and personal data from the mobile unit and a memory which stores the program and personal data. According to a preferred embodiment, the monitoring equipment comprises a decoder for retrieving and decoding a program code embedded in a program received by the receiver, wherein the transmitter transmits the program label code from the decoder to the mobile unit. The monitoring equipment also comprises an ON/OFF detector for determining when the receiver is on. The audience member interface of the mobile unit may comprise a display for displaying prompting messages to the audience member and a keypad for receiving key entries from the audience member. The system may also include voice recognition circuitry for recognizing voice signals input by the user. The base unit may further comprise telephone circuitry for transmitting the program and personal data to a data collection central facility via a public switch telephone network.

According to another aspect of the present invention, an audience measurement system for a receiver comprises a mobile unit having a transceiver and an audience member interface which prompts an audience member to enter program and personal data and receives data from the audience member, and a base unit having a transceiver for receiving the program and personal data from the mobile unit and a memory for storing the program and personal data.

According to yet another aspect of the present invention, an audience measurement system comprises a monitor arranged to detect and transmit a program label code contained in a program to which a receiver is tuned, a mobile telephone handset located remotely from the monitor and modified to receive the program label code transmitted by the monitor and to receive a personal identification from an audience member, and the base unit located remotely from the monitor and the handset and having a receiver to receive the program label code and the personal identification from the handset.

According to still another aspect of the present invention, an audience measurement system for a receiver comprises a mobile unit, located remotely from the receiver, including a sensor for detecting a signal from the receiver, a decoder for retrieving an decoding a program code embedded in the detected signal, an audience member interface which receives personal data from an audience member, and a transceiver. This system further includes a base unit having a transceiver which receives the personal data and decoded program information from the mobile unit.

BRIEF DESCRIPTION OF THE DRAWINGS

These and other features and advantages of the present invention will become more apparent from a detailed consideration of the invention when taken in conjunction with the following drawings.

DETAILED DESCRIPTION

Figure 1:
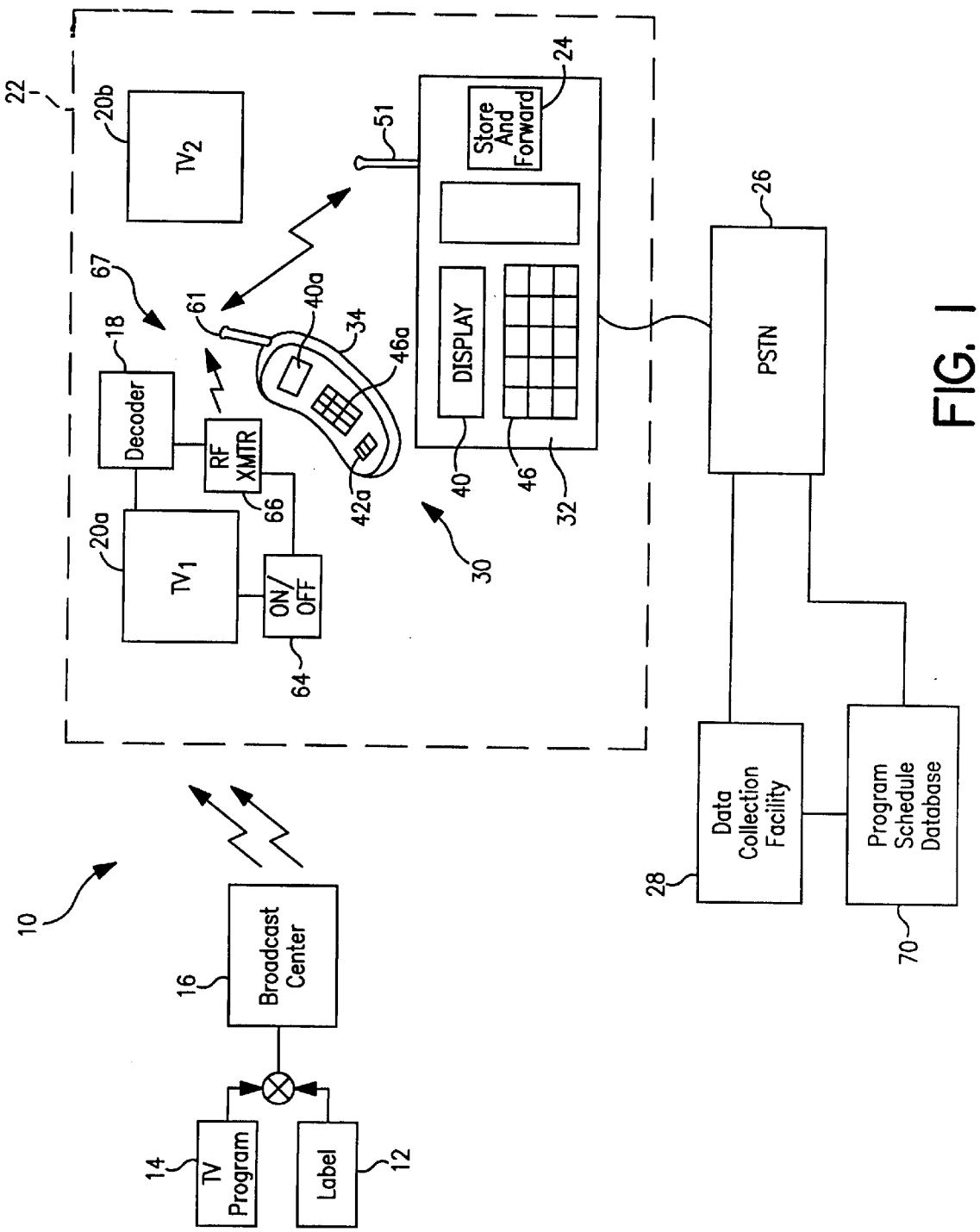
FIG. 1 is a schematic diagram of a data collection system of the invention.

A television audience data collection system 10 of the invention is schematically depicted in FIG. 1. Many contemporary television broadcasters conventionally add ancillary labels 12 to programs 14 prior to or at the point of broadcasting 16. Thus, a preferred embodiment of the invention employs a decoder 18 attached to or adjacent a television receiver 20a located in a statistically selected dwelling unit 22 to read labels from displayed programs as a means of identifying what is being viewed in the dwelling unit 22. The dwelling unit 22 may also include additional television receivers, such as a receiver 20b. As noted above, various arrangements for adding labels to and reading labels from programs are taught by Thomas et al., U.S. Pat. No. 5,481,294.

As is also conventional in the art, audience data are stored in a store-and-forward unit 24 in the dwelling unit 22 for subsequent transmission, via a public switched telephone network (PSTN) 26, to a data collection central facility (or facilities) 28. Other similar arrangements (e.g., transmitting a television signal to the dwelling unit 22 via a two-way cable system and communicating viewing data from the dwelling unit 22 to the data collection central facility 28 via the same cable) are also well known in the art. The data collection central facility 28 also provides information, such as instructions, messages and/or program/parameter updates, to the base unit.

Some of the functions of the television audience data collection system 10 are provided by modified in-home telephone equipment 30, which may preferably comprise a Screen Phone™ Model Philips P100 or P200, manufactured by Philips Home Services. The modified in-home telephone equipment 30 comprises a base unit 32 (which incorporates the store-and-forward unit 24) and one or more mobile units 34, such as portable telephone handsets which may be carried by an audience member, as described in greater detail below.

Figure 2:
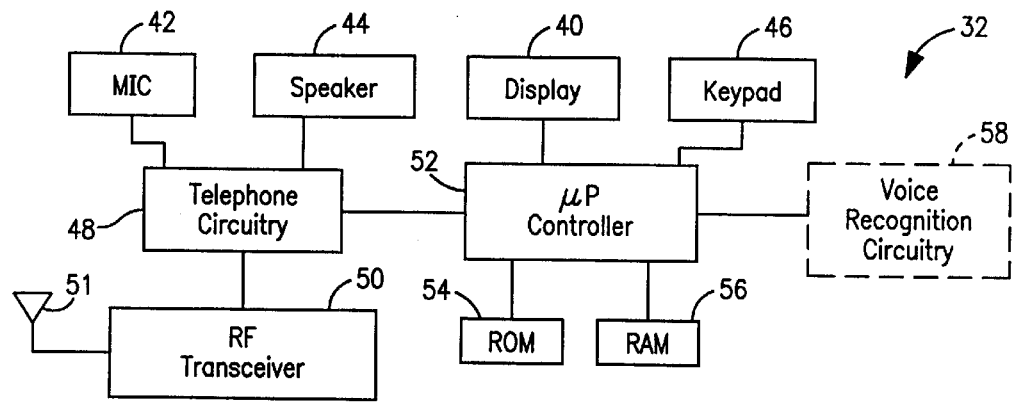
FIG. 2 is a schematic block diagram of the base unit portion of the system.

The base unit 32, as schematically depicted in FIGS. 1 and 2, comprises a display 40 as well as conventional telephone components, such as a microphone 42, a speaker 44, a keypad 46, and telephone communication circuitry 48 for connection to the public switched telephone network 26. The base unit 32 also comprises a radio frequency (RF) transceiver circuit 50, including an antenna 51, and a microprocessor controller 52 having both a read-only memory (ROM) 54 and read-write memory (RAM) 56 operatively associated therewith. In some embodiments of the invention, the base unit 32 has voice recognition capability, which may be provided by means of added voice recognition circuitry 58, or which may be provided by software resident in the ROM 54.

Figure 3:
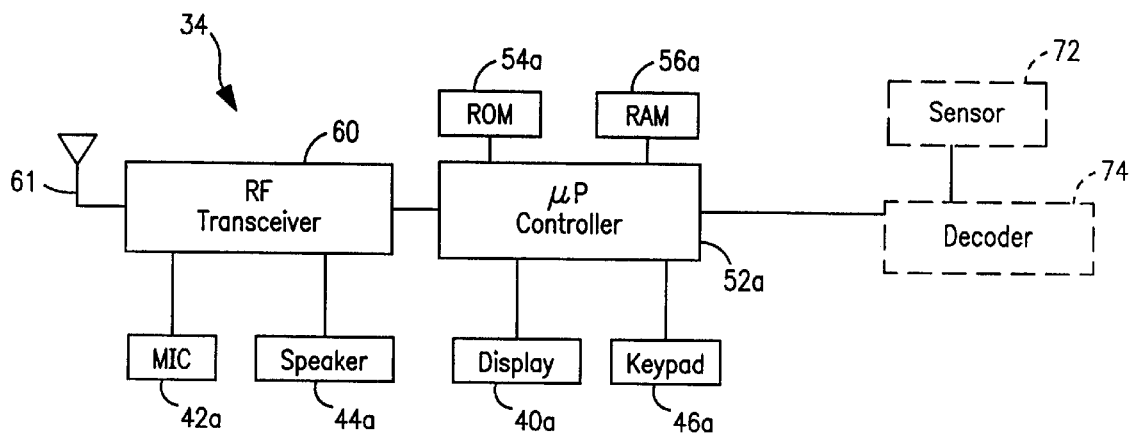
FIG. 3 is a schematic block diagram of the mobile unit portion of the system.

Referring to FIGS. 1 and 3, the mobile unit 34 comprises a microphone 42a, a display 40a, a speaker or telephone earpiece 44a and a keypad 46a. Like the base unit 32, the operation of the mobile unit 34 is controlled by a microprocessor 52a having a read-only memory (ROM) 54a and random access memory (RAM) 56a associated therewith. An RF transceiver 60, including an antenna 61, is used for communication with the base unit 32, as is conventional in the telephony arts, and may also be used for communication with an RF transmitter 66 coupled to the decoder 18 and an ON/OFF detector 64 associated with the receiver 20a.

The mobile unit 34 is preferably a modified telephone handset, where the modifications may involve: (i) changes to the handset's RF transceiver circuitry in order to provide the RF transceiver 60 with the capability of non-interfering communication with both the base unit 32 and television monitoring equipment 67 (which comprises, for example, the decoder 18, the ON/OFF detector 64 and the RF transmitter 66); (ii) addition of memory capacity in the form of the RAM 56a; and/or (iii) changes in the program stored in the ROM 54a and used to control operation of the microprocessor controller 52a. In cases where the smart telephone already provides handset-to-handset communication and adequate multi-channel capability via CDMA or other known multiplexing arrangements, the RF transceiver 60 need not be physically modified.

The mobile unit 34 is used for gathering personal data by prompting an audience member for data input. This data input may be provided by using the keypad 46a to collect a predetermined sequence of keystrokes uniquely associated with each audience member. For example, in response to a characteristic prompting sound (i.e., some sound or sequence of sounds readily distinguishable from a telephone ringing signal) generated by the mobile unit 34, an audience member could press that number key uniquely assigned to him or her and then press the "#" key to indicate completion of the data entry string. In other embodiments of the invention, an audience member may respond to the prompt by speaking into the microphone 42a (e.g., by saying his or her name or by saying the name of each person present in the monitored area). In these embodiments, voice recognition circuitry 58, which may be provided in the base unit 32, would be used to determine who is in the audience. In a variation of this arrangement, the identifying voice signals transmitted from the mobile unit 34 to the base unit 32 would be processed in the base unit 32 to extract from them characteristic feature patterns that could be transmitted to the data collection central facility 28 for identification by a pattern recognition means there. Alternatively, the voice recognition circuitry could be installed in the mobile unit 34 or in the data collection central facility 28.

It is well known in the audience measurement and allied arts that systems relying on prompting signals sent to cooperating audience members must be concerned about the frequency and intensity of those prompting signals. If a cooperating individual perceives the prompting signals as being so intrusive or so frequent as to be annoying, he or she is likely to stop cooperating. On the other hand, if the selected prompting arrangement is either too muted or too infrequent, the cooperating individual may forget to enter data at appropriate times. Moreover, the optimal prompting strategy will depend on the cooperating individual. For example, it is reasonable to expect that a prompting arrangement with frequent and loud prompts might be deemed acceptable by an elderly, partially deaf person who is highly motivated to cooperate with a television audience survey. The same prompting arrangement might well be considered to be obnoxiously loud and burdensome if used with a teenage audience member. Therefore, the system of the invention may use audience response data in an adaptive prompting algorithm to select both the exact nature of the prompting signal and the frequency with which prompting occurs. Preferably, the system may also disable prompting immediately after delivering a prompting message and then wait a minimum predetermined time interval before again enabling prompting.

In some embodiments of the invention, the television monitoring equipment 67 is attached to or installed adjacent the television receiver 20a. (FIG. 1). The monitoring equipment 67 may comprise the ON/OFF detector 64, the RF transmitter 66, and the decoder 18 for reading a program-identifying code or label. Both ON/OFF detectors and decoders are well known in the television audience measurement arts. A preferred ON/OFF detector may comprise a tuned circuit placed adjacent the receiver 20*a* to pick up the horizontal retrace frequency signal that is indicative of the set being on. In a preferred arrangement, the ON/OFF detector 64 and the decoder 18 may be combined in a single sensor as taught by Chan in U.S. Pat. No. 5,889,548.

Another approach for obtaining a video signal from which the program label can be read comprises opening the monitored TV and attaching the decoding equipment to a video test point. Other known approaches to decoding a program label from a broadcast signal use codes written in the audio portion of the composite television signal. The RF transmitter 66 of the monitoring equipment 67 is used to transmit to the mobile unit 34 a signal indicating that the receiver 20*a* is ON, and, in a preferred embodiment, a second signal comprising the program identifying label read by the decoder 18.

In an alternative embodiment, the receiver monitoring equipment may be incorporated into the mobile unit 34, as depicted by the dashed lines in FIG. 3. In this embodiment, the receiver monitoring equipment in the mobile unit 34 includes a sensor 72 coupled to a decoder 74. The sensor 72 may be an optical sensor which detects the video illuminance signal from the monitored receiver 20*a* and/or an audio sensor which detects an audio signal from the monitored receiver 20*a*. The decoder 74 extracts the program code from the detected signal. Preferably, the sensor 72 is a directional sensor which is directed towards the desired receiver to avoid ambiguities if more than one receiver is present in the dwelling unit 22.

Although many systems have been proposed for gathering tuning data by reading ancillary program labels, all of these potentially provide incomplete data when a viewable program is received without a legible code embedded in it. A preferred system of the invention provides a remedy for this problem by prompting the audience member with a list of currently receivable programs whenever an unlabeled program is encountered. The list of possible programs is obtained from a dial-up remote program schedule database 70 (FIG. 1). Records on databases of this sort comprise a schedule of programs and their times of broadcast. To use these data, the measurement system 10 may download them as required, or on a regular scheduled basis in anticipation of some of the downloaded data being needed. For example, the base unit 32 could be programmed to call the database 70 once each day and download a schedule of all the programs that would be viewable in that particular dwelling unit during the ensuing day. Alternatively, the data collection facility 28 may periodically download information from the database 70 and then forward the database information to the base unit 32 during the regularly scheduled communications between the base unit 32 and the data collection facility 28.

Alternatively, the audience member may be prompted to enter a channel number, a program guide number or other information that uniquely identifies the program being watched.

Figure 4:
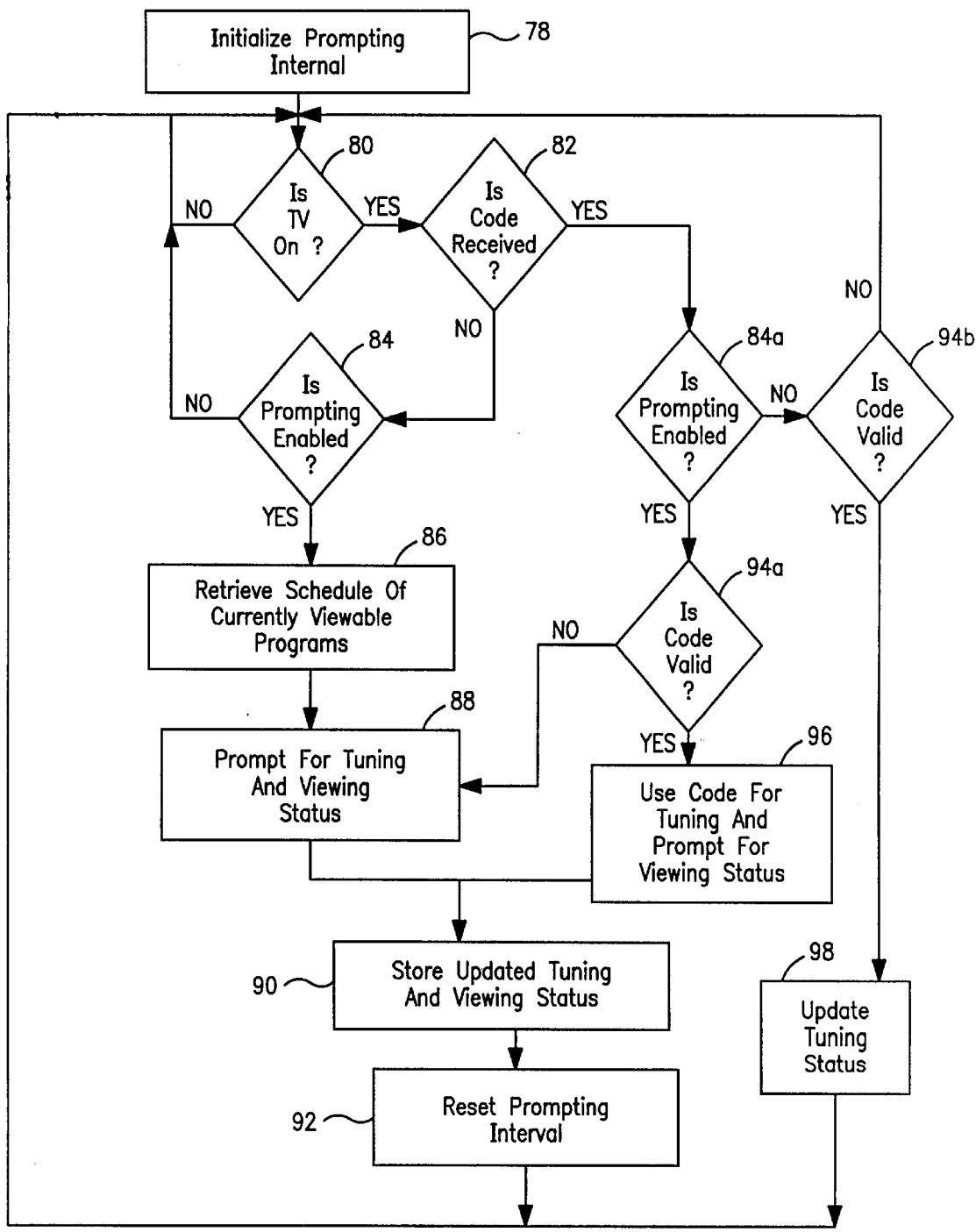
FIG. 4 is a flow chart depicting operations carried out by the mobile unit.

FIG. 4 is a flow chart of operations that may be carried out by a preferred system of the invention using television monitoring equipment 67 (decoder 18, ON/OFF detector 64 and RF transmitter 66) and the remote program schedule database 70. The programming of FIG. 4 is preferably stored in the ROM 54 of the base unit 32 and implemented by the microprocessor controller 52 of the base unit 32. However, the programming could also be implemented by the microprocessor controller 52*a* in the mobile unit 34.

A block 78 first initializes the prompting interval to a predetermined time. The interval may be set, for example, to prompt the audience member every fifteen minutes. A block 80 then determines whether the television receiver 20*a* is ON, based on the signal provided by the ON/OFF detector 64. If the television receiver 20*a* is ON, a block 82 determines whether a program code is received from the decoder 18. If no program code is received, a block 84 determines whether audience prompting is enabled. If yes, a block 86 retrieves program schedule data on currently viewable programs. The program schedule data was preferably previously downloaded from the remote program schedule database 70 to the base unit 32 via the public switched telephone network 26 and stored in the RAM 56. A block 88 then prompts the audience member to provide both tuning and viewing data—i.e. who they are and what they are watching. The block 88 may prompt the audience member by an audible signal, a visual display of available programs and known household members on the display 40*a* of the mobile unit 34, and/or the like.

A block 90 stores the tuning and viewing data entered by the audience member in the RAM 56 of the base unit 32. Preferably, the block 90 also time stamps the stored tuning and viewing data. A block 92 resets the prompting interval and the program repeats by returning to the block 80. The tuning and viewing data could also be temporarily stored in the RAM 56*a* of the mobile unit 34 and provided to the base unit 32 at a later time.

Alternatively, if the block 84 determines that prompting is not enabled when the television receiver 20*a* is ON but no program code is found, the system enters a loop (comprising the blocks 80, 82 and 84) that continues until prompting is enabled.

If the block 82 determines that a program code is received, a block 84*a* determines whether audience prompting is enabled and, if so, then a block 94*a* determines whether the program code is valid.

If the block 84*a* determines prompting is enabled and the block 94*a* determines that the program code is valid, a block 96 prompts the audience member for viewing data (i.e. who they are) and control passes to the block 90 to time stamp and store the updated tuning status (determined from the program code) and viewing status (input by the audience member) in the RAM 56. The block 92 then resets the prompting interval and the program repeats.

Alternatively, if prompting is enabled and the block 94*a* determines that the program code is not valid, the program skips to the block 88, which prompts the audience member to input tuning and viewing status information. The block 88 may, for example, display the names of several programs and ask the audience member to choose which program he/she is viewing.

If the block 84*a* determines that prompting is not enabled and a block 94*b* determines that the program code is valid, a block 98 stores the updated tuning status and the program returns to the block 80. Alternatively, if prompting is not enabled and the block 94*b* determines that the program code is not valid, the program repeats by returning to the block 80.

The exact nature of the prompting sequence and of the data displayed to the audience member during prompting will depend on the requirements from the industry. The information being displayed may or may not include the station identification and/or program names. For example, displaying a program guide of program names may influence an audience member's current viewing decision. If the audience member was going to watch, for example, a news program on one channel and then saw on the display that a movie was playing on another channel, the audience member might choose to watch the movie instead. Therefore, it may be desirable to display only channel or station identification for current viewing information. However, if an audience member is inputting previous viewing information, it may be preferable to display a program guide to help the audience member recall what they watched.

The present invention uses a RF link between the television monitoring equipment 67 and the mobile unit 34. Therefore, RF modulation and tuning techniques allow each mobile unit 34 to receive its corresponding program code. (It is assumed the second receiver 20b includes the same monitoring equipment (decoder 18, ON/OFF detector 64 and RF transmitter 66) as the first receiver 20a, except that each RF transmitter has a different tuning frequency and/or address code.)

Also, to eliminate any ambiguities that may occur, if more than one program code is received, the mobile unit 34 may display program information corresponding to each of the program codes and prompt the user to select the correct program.

Figure 5:
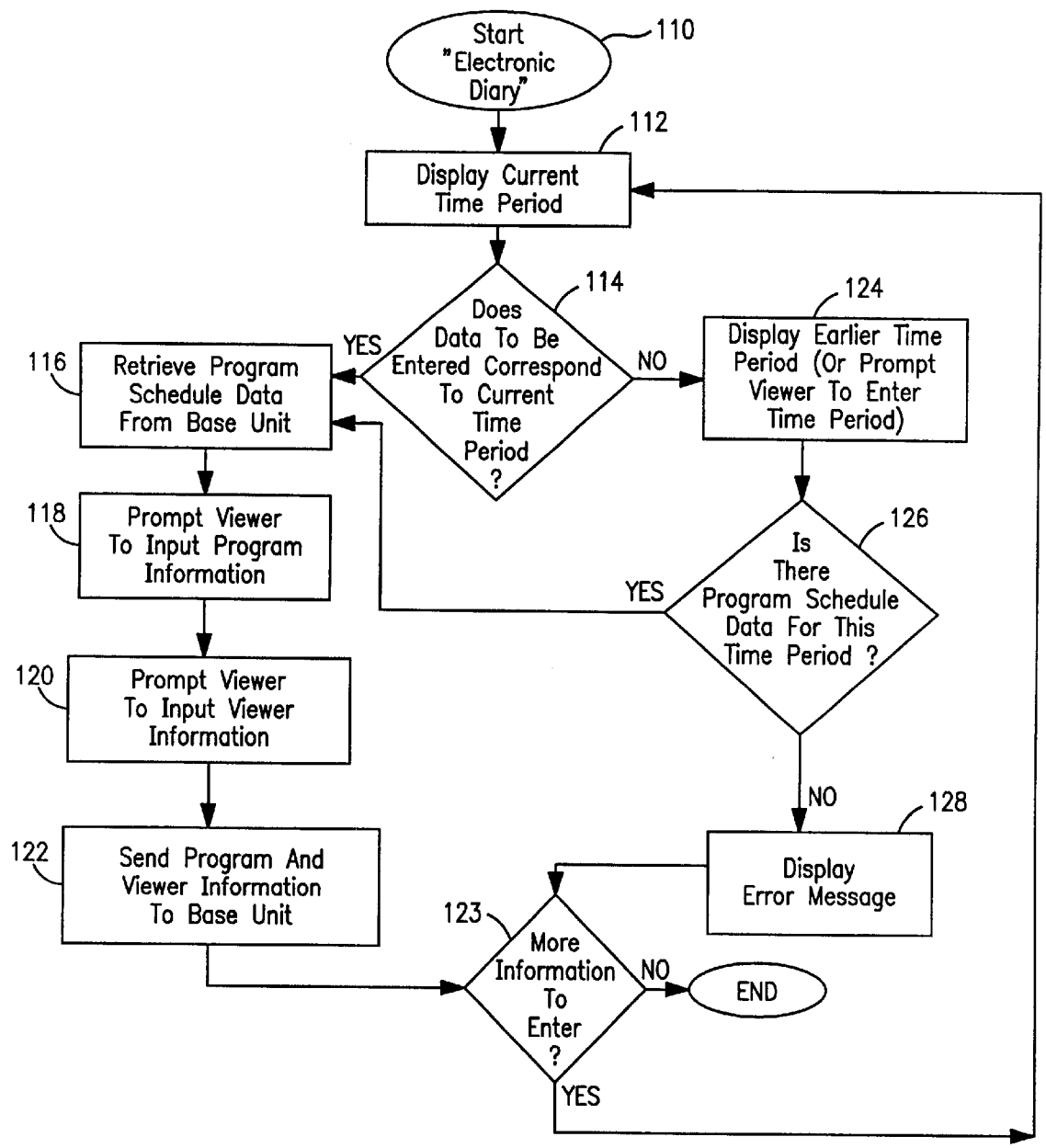
FIG. 5 is a flow chart depicting steps in the process of displaying program schedule information to a audience member and for accepting audience member input as to programs viewed.

In an alternative embodiment of the present invention, the television monitoring equipment 67 (decoder 18, ON/OFF detector 64 and RF transmitter 66) associated with the television receiver 20a is eliminated and the system relies solely on soliciting input from a cooperating panelist via the mobile unit 34. This alternative embodiment may be described as an "electronic diary" system, which is exemplified by the flow chart of FIG. 5. The electronic diary is activated at a block 110 by an audience member indicating that data is to be entered (such as by picking up/turning on the mobile unit 34 or pushing a key on the keypad 46a). Next, a block 112 displays the current time period. The time period may be displayed by a conventional television audience diary measurement method, wherein each viewing day is divided into quarter-hour segments, or by any other method, such as a 24-hour clock.

A block 114 then requests the audience member to confirm that the current data to be entered corresponds to the current time period. If this is the case, a block 116 retrieves the current program schedule from the RAM 56 of the base unit 32, and a block 118 prompts the audience member to select which program was viewed. A block 120 also prompts the audience member to input audience member information, i.e., who viewed the program. A block 122 then sends the program and audience member information to the base unit 32 and a block 123 asks the audience member whether there is any additional information to be entered. If yes, the program returns to the block 112. Otherwise, the program terminates until a audience member reactivates the electronic diary.

Alternatively, if the block 114 determines that the audience member wants to enter data from an earlier time period, a block 124 displays an earlier time period (i.e. fifteen minutes earlier than the current time). In an alternative embodiment, the block 124 may prompt a user to enter the time period for which they wish to enter data. A block 126 then determines whether there is stored program schedule data for this time period. If yes, the program returns to the block 116, which retrieves the program data corresponding to the earlier time period. The user is then prompted by blocks 118 and 120 to enter program and viewer information and the block 122 sends the information to the base unit. Otherwise, a block 128 displays an error message. The program then skips to the block 123 which determines whether the audience member has more information to enter. If yes, the program returns to the block 112; if no, the program terminates.

Although the present invention has been described with respect to several preferred embodiments, many modifications and alterations can be made without departing from the invention. For example, although the detailed description focuses on a television audience measurement system, the invention could also measure audiences for radios, computers, interactive service devices or other devices. Accordingly, it is intended that all such modifications and alterations be considered as within the spirit and scope of the invention as defined in the attached claims.

What is claimed is:

1. An audience measurement system for a receiver, comprising:

monitoring equipment associated with the receiver and connected to a transmitter;

a mobile unit having a transceiver which receives program data from the transmitter and an audience member interface which prompts an audience member to enter personal data and receives data from the audience member; and a base unit having a transceiver which receives the program and personal data from the mobile unit and a memory which stores the program and personal data, wherein the base unit further receives information from the data collection central facility.

2. The system of claim 1, wherein the monitoring equipment comprises a decoder for retrieving and decoding a program code embedded in a program received by the receiver.

3. The system of claim 2, wherein the transmitter transmits the program code from the decoder to the mobile unit.

4. The system of claim 1, wherein the monitoring equipment comprises an ON/OFF detector for determining whether the receiver is ON.

5. The system of claim 4, wherein the transmitter transmits a signal from the ON/OFF detector to the mobile unit when the receiver is ON.

6. The system of claim 1, wherein the transmitter is a radio frequency transmitter.

7. The system of claim 1, wherein the audience member interface of the mobile unit comprises a display for displaying prompting messages to the audience member.

8. The system of claim 1, wherein the audience member interface of the mobile unit comprises a keypad for receiving key entries from the audience member.

9. The system of claim 1, further comprising voice recognition circuitry.

10. The system of claim 9, wherein the voice recognition circuitry is installed in the base unit.

11. The system of claim 9, wherein the voice recognition circuitry is installed in the mobile unit.

12. The system of claim 9, wherein the audience member interface of the mobile unit comprises a microphone for receiving voice signals from the audience member.

13. The system of claim 9, wherein the audience member interface of the mobile unit comprises a speaker for transmitting audio prompting messages to the audience member.

14. The system of claim 1, wherein the audience member interface prompts the audience member to enter program data if no program data is received from the monitoring apparatus.

15. The system of claim 1, wherein the mobile unit comprises a telephone handset.

16. The system of claim 1, wherein the mobile unit further comprises a controller and a memory.

17. The system of claim 1, wherein the base unit further comprises telephone circuitry for transmitting the program and personal data to a data collection central facility via a public switched telephone network.

18. The system of claim 1, further comprising a controller arranged to retrieve a program schedule from a program schedule database.

19. The system of claim 18, wherein the program schedule is stored in the memory of the base unit.

20. The system of claim 18, wherein the base unit transmits the program schedule to the mobile unit.

21. The system of claim 1, wherein the mobile unit transceiver communicates with the base unit transceiver via radio frequency.

22. The system of claim 1, wherein the base unit further comprises a controller for time stamping the stored program and personal data.

23. The system of claim 1, wherein the receiver comprises a television receiver.

24. The system of claim 1, wherein the receiver comprises a radio receiver.

25. The system of claim 1, wherein the receiver comprises an interactive services device.

26. The system of claim 1, wherein the receiver comprises a computer.

27. A method comprising the following steps:
   a) determining whether a receiver is on;
   b) if the receiver is on, determining whether a program identification datum is available for extraction from the program;
   c) if a program identification datum is available for extraction from the program, extracting the program identification datum and prompting the user to enter an identification of the user; and,
   d) if a program identification datum is not available for extraction from the program, displaying currently available programs to which a receiver may be tuned, prompting a user to select, from the currently available programs, a program to which the receiver is tuned, and prompting the user to enter an identification of the user.

28. The method of claim 27 wherein the program identification datum is a program identifying code.

29. The method of claim 27 wherein the program identification datum is a signature characteristic of a program.

30. The method of claim 27 further comprising the step of storing the program identification datum and the user identification.

31. The method of claim 27 further comprising the step of transmitting the program identification datum and the user identification to an apparatus.

32. The method of claim 31 wherein the apparatus is a local base unit.

33. The method of claim 31 wherein the apparatus is a remote facility.

34. The method of claim 27 further comprising the step of retrieving the currently available programs as a program guide from a remote facility.

35. A method comprising the following steps:
   a) displaying a first time period;
   b) determining whether data to be entered corresponds to the first time period;
   c) if the data to be entered corresponds to the first time period, displaying programs tunable by a receiver during the first time period and prompting a user to enter a program identification corresponding to at least one of the displayed programs tunable by the receiver during the first time period; and,
   d) if the data to be entered does not correspond to the first time period, displaying a second time period, displaying programs tunable by a receiver during the second time period, and prompting a user to enter a program identification corresponding to at least one of the displayed programs tunable by the receiver during the second time period.

36. The method of claim 35 wherein step c) comprises the step of prompting the user to enter an identification of the user.

37. The method of claim 36 further comprising the step of storing the program identification and the user identification.

38. The method of claim 36 further comprising the step of transmitting the program identification and the user identification to an apparatus.

39. The method of claim 35 wherein step d) comprises the step of prompting the user to enter an identification of the user.

40. The method of claim 39 further comprising the step of storing the program identification and the user identification.

41. The method of claim 39 further comprising the step of transmitting the program identification and the user identification to an apparatus.

42. The method of claim 35 further comprising the step of storing the program identification.

43. The method of claim 35 further comprising the step of transmitting the program identification to an apparatus.

44. The method of claim 43 wherein the apparatus is a local base unit.

45. The method of claim 43 wherein the apparatus is a remote facility.

46. The method of claim 35 further comprising the step of retrieving the programs as a program guide from a remote facility.

47. An audience measurement system for a receiver comprising:
   monitoring equipment associated with the receiver and connected to a transmitter;
   a mobile unit having a transceiver which receives program data from the transmitter and an audience member interface which prompts an audience member to enter personal data and receives data from the audience member, wherein the audience member interface prompts the audience member to enter program data if no program data is received from the monitoring apparatus; and,
   a base unit having a transceiver which receives the program and personal data from the mobile unit and a memory which stores the program and personal data.

48. The system of claim 47 wherein the monitoring equipment comprises a decoder for retrieving and decoding a program code embedded in a program received by the receiver, and wherein the transmitter transmits the program code from the decoder to the mobile unit.

49. The system of claim 47 wherein the monitoring equipment comprises an ON/OFF detector for determining whether the receiver is ON, and wherein the transmitter transmits a signal from the ON/OFF detector to the mobile unit when the receiver is ON.

50. The system of claim 47 wherein the audience member interface of the mobile unit comprises a display for displaying the prompts to the audience member.

51. The system of claim 47 wherein the mobile unit comprises a telephone handset.

52. The system of claim 47 wherein the base unit further comprises a transmitter arranged to transmit the program and personal data to a remote data collection central facility.

53. The system of claim 47 wherein the base unit receives information from a remote data collection central facility.

54. The system of claim 47 wherein the mobile unit has a memory that stores a program schedule retrieved from a program schedule database.

55. An audience measurement system for a receiver comprising:
- monitoring equipment associated with the receiver and connected to a transmitter;
- a mobile unit having a transceiver which receives program data from the transmitter and an audience member interface which prompts an audience member to enter personal data and receives data from the audience member; and,
- a base unit having a transceiver which receives the program and personal data from the mobile unit and a memory which stores the program and personal data, wherein the base unit further receives information from a remote data collection central facility.

56. The system of claim 55 wherein the monitoring equipment comprises a decoder for retrieving and decoding a program code embedded in a program received by the receiver, and wherein the transmitter transmits the program code from the decoder to the mobile unit.

57. The system of claim 55 wherein the monitoring equipment comprises an ON/OFF detector for determining whether the receiver is ON, and wherein the transmitter transmits a signal from the ON/OFF detector to the mobile unit when the receiver is ON.

58. The system of claim 55 wherein the audience member interface of the mobile unit comprises a display for displaying the prompts to the audience member.

59. The system of claim 55 wherein the mobile unit comprises a telephone handset.

60. The system of claim 55 wherein the base unit further comprises a transceiver arranged to transmit the program and personal data to a remote data collection central facility and to receive the information from the remote data collection central facility.

61. The system of claim 55 wherein the mobile unit has a memory that stores a program schedule retrieved from a program schedule database.

62. A method comprising:
- remotely receiving at a mobile unit program data from a program receiver that provides program material to an audience member;
- prompting via the mobile unit the audience member to enter personal data into the mobile unit;
- prompting via the-mobile unit the audience member to enter program data if no program data is received from the program receiver; and,
- transferring the program and personal data to a remote data collection facility.

63. The method of claim 62 comprising retrieving a program code from a program at the program receiver, and transmitting the program code to the mobile unit.

64. The method of claim 62 comprising detecting whether the receiver is ON, and transmitting a signal from the program receiver to the mobile unit indicating that the program receiver is ON.

65. The method of claim 62 comprising visually displaying at the mobile unit the prompts to the audience member.

66. The method of claim 62 comprising receiving information from the remote data collection central facility.

67. The method of claim 62 comprising storing at the mobile unit a program schedule retrieved from a program schedule database.

* * * * *